United States Patent [19]

Brehm et al.

[11] Patent Number: 5,556,930
[45] Date of Patent: Sep. 17, 1996

[54] COPOLYMERS AND THEIR USE IN THE TREATMENT OF LEATHER

[75] Inventors: Helmut Brehm, Krefeld; Leonardus Strijbos, Tönisvorst; Hans-Bernhard Eikmeier, Kempen, all of Germany

[73] Assignee: Chemische Fabrik Stockhausen GmbH, Krefeld, Germany

[21] Appl. No.: 448,338

[22] PCT Filed: Nov. 30, 1993

[86] PCT No.: PCT/EP93/03350

§ 371 Date: Jun. 12, 1995

§ 102(e) Date: Jun. 12, 1995

[87] PCT Pub. No.: WO94/13716

PCT Pub. Date: Jun. 23, 1994

[30] Foreign Application Priority Data

Dec. 12, 1992 [DE] Germany ............ 42 42 039.3

[51] Int. Cl.⁶ .................. C08F 220/06; C08F 220/28; C14C 3/22
[52] U.S. Cl. .............. 526/318.5; 8/94.21; 526/320
[58] Field of Search .............. 526/318.5, 320; 8/94.21

[56] References Cited

U.S. PATENT DOCUMENTS 4,338,239  7/1982  Dammann ..................... 524/549

Primary Examiner—Joseph L. Schofer
Assistant Examiner—Wu C. Cheng
Attorney, Agent, or Firm—Oblon, Spivak, McClelland, Maier, & Neustadt, P.C.

[57] ABSTRACT

The present invention relates to copolymers built up of a) 20–60%-wt. ethylenically unsaturated acid-groups-comprising monomers, b) 40-80%-wt. ethylenically unsaturated glycerol derivatives in which one hydroxyl group of the glycerol is unsubstituted, one hydroxyl group is etherified with (meth)-allyl alcohol and the third hydroxyl group is etherified with a $C_{12}$–$C_{24}$-alcohol or $C_{12}$–$C_{24}$-alkyl phenol or esterified with a $C_{12}$–$C_{40}$-monocarboxylic acid and c) 0–30%-wt. other ethylenically unsaturated monomers copolymerizable with the monomers a) and b), whereby the sum of the monomers a+b+c=100. The present invention further relates to the use of said copolymers for the softening of leather. The copolymers according to the present invention result in an improved exhaustion during the leather treatment.

14 Claims, No Drawings

COPOLYMERS AND THEIR USE IN THE TREATMENT OF LEATHER

The present invention relates to copolymers built up of ethylenically unsaturated acid-groups-containing monomers, ethylenically unsaturated glycerol derivates and optional further ethylenically unsaturated monomers copolymerizable with the above monomers. The present invention further relates to the use of these copolymers in the treatment of leather.

Fat liquors and greases for leather and fur manufacturing are produced —among other methods—by introducing sulfonate and/or sulfate groups into unsaturated oils and fats. The water-soluble or water-emulsifiable compounds so obtained are used in the liquoring float, optionally together with other auxiliaries, e.g., emulsifiers or unsulfonated oils.

In addition to said fat liquors and greases which are mainly based on natural fatty substances, such as fish oil or lard oil, dissolved or dispersed polymers are used in the treatment of leather. DE-3931039 A1 describes the use of copolymers of long-chain, hydrophobic and hydrophilic monomers to render leathers and fur skins hydrophobic. The copolymers, which are used in a partially neutralized form dispersed in water, comprise as hydrophobic monomers 50 to 90%-wt. C8–C40-alkyl(meth)-acrylates, vinyl ester of C8–C40-carboxylic acids and, as preferred hydrophilic monomers, 10 to 50%-wt. acrylic acid, methacrylic acid, maleic acid, maleic anhydride, itaconic acid and itaconic anhydride. EP 0372746 A, which considers in detail the polymers proposed in literature for the treatment of leather, claims an aqueous dispersion of a copolymer for retanning, fat-liquoring and hydrophobing leather. The claimed copolymer consists of 10 to 50%-wt. of a hydrophilic monomer and 50 to 90%-wt. of a hydrophobic comonomer. The known monoethylenically unsaturated mono- and dicarboxylic acids are used as hydrophilic monomers. The hydrophobic monomers used for the production of the copolymers are C8–C22-esters of the acrylic and methacrylic acid, alkenes and vinyl esters of long-chain carboxylic acids.

The copolymers are used to treat conventionally tanned hides, e.g., hides tanned with mineral tanning agents, such as chromium-(III)-salts. To this end, the hides are deacidified after washing, washed again with an aqueous dispersion comprising 3 to 10%-wt. copolymer, relative to the weight of the tanned leather, and milled in a drum at 30° to 50° C. The float ratio normally amounts to 100%, i.e., the weight ratio of treatment liquid to shaved weight of the leather amounts to 1:1. After 0.5 to 2 hours of milling, the copolymer is fixed to the hide by adding a 10% formic acid solution.

The residual float is drained off and the hide is washed with water once again.

Even if an optimal amount of copolymer in the float was used, i.e., a quantity which, relative to the shaved weight, just results in a soft, supple leather, the residual bath, i.e., the liquid which is rejected after the treatment of the leather, comprises non-exhausted treating agents. Accordingly, it is an object to provide copolymers for treating, in particular for softening leather which are exhausted to a larger extent so as to relieve the waste water resulting from the leather treatment.

According to the present invention, this object is achieved by using copolymers which comprise incorporated therein by polymerization
a) 20 to 60%-wt. ethylenically unsaturated monomers having acid groups,
b) 40 to 80%-wt. ethylenically unsaturated glycerol derivatives of the general formula (1)

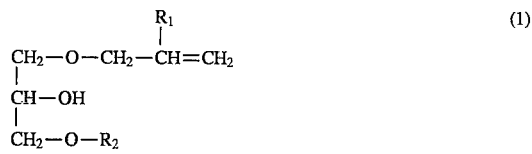

with $R_1$=H, methyl
$R_2$=$C_{12}$-$C_{24}$-alkyl, $C_{12}$-$C_{24}$-alkylaryl $C_{12}$-$C_{40}$-acyl
and
c) 0 to 30%-wt. other ethylenically unsaturated monomers copolymerizable with the monomers a) and b),
and which are used in an at least partially neutralized form for the treatment of leathers and fur skins, whereby the sum of monomers a+b+c=100.

It is known to use the above-mentioned monomers a) and b) for the manufacture of copolymers. U.S. Pat. No. 4338239 describes a thickener for polar organic solvents and aqueous systems which comprises at least 60%-wt. monomers of group a) and 0.2 to 20%-wt. monomers of group b). These copolymers are unsuitable for fat-liquoring and greasing leathers. The copolymers according to the present invention which are suitable for softening leathers comprise 20 to 60%-wt., ethylenically unsaturated acid-groups-containing monomers of group a), such as acrylic acid, methacrylic acid, dimethylacrylic acid, maleic acid, fumaric acid, monoalkylmaleinate, monoalkylglycol maleinate, (meth-)allyl sulfonic acid, acrylamidomethylpropane sulfonic acid, allyl phosphonic acid, and mixtures of these monomers.

Polymerizable glycerol derivatives used at an amount of 40 to 80%-wt. in the copolymerization form part of group b). In said glycerol derivatives, one hydroxyl group of the glycerol is unsubstituted, one hydroxyl group is etherified with (meth-)allyl alcohol, and the third hydroxyl group is etherified with a C12–C24-alcohol or C12–C24-alkyl phenol or it is esterified with a C12–C40-monocarboxylic acid.

The ethylenically unsaturated glycerol derivatives are manufactured, e.g. according to EP 0458635 A2, by reacting (meth-)allyl glycidic ether in the presence of alkali or Lewis acids with C12–C24-fatty alcohols, such as dodecyl alcohol, isotridecyl alcohol, tallow fatty alcohol and with alcohols of the oxo synthesis. Dinonyl phenol and dodecyl phenol are suitable for the reaction with (meth-)allyl glycidic ether, too. To form the esters of the glycerol-(meth-)allyl ether C12–C40-fatty acids, such as lauric acid, palmitic acid, myristic acid and stearic acid, are reacted with (meth-)allyl glycidic ether. Also, mixtures of glycerol allyl ether derivatives may be used as monomers of group b).

The copolymers of the monomers of groups a) and b) may optionally be modified by copolymerization in the presence of a maximum of 30%-wt. of the monomers of group c). Suitable monomers of group c) include c1) hydrophobic monomers, such as C8–C24-esters or C8–C26-amides of (meth)-acrylic acid, vinyl esters of C8–C24-carboxylic acids, C10–C18-α-olefins and/or c2) C1–C8-esters or amides of (meth-)acrylic acid, hydroxy-C2–C4-esters of (meth-)acrylic acid, di-C1–C6-alkyl esters of maleic acid, styrene, alkyl styrene and vinyl esters of C1–C8-carboxylic acids.

The production of the copolymers is effected according to known polymerization processes. To copolymerize the monomers of group a), b) and, optionally, c), the inflow process is preferred, i.e., the monomers polymerizing slowly are placed in the reactor and the more reactive monomers as well as the catalyst system are metered thereto over a longer period of time.

If the polymerization is carried out in the presence of an inert organic diluting agent, it is preferred to choose a diluting agent which need not be separated after the polymerization, for example, butyl glycol.

To initiate the polymerization, the conventional initiator systems are added to the polymerization batch, these include azo compounds, redox systems and peroxy compounds, preferably tertiary butyl peroxide, tertiary butyl peroxypivalate, dicyclohexyl peroxydicarbonate, cumene hydroperoxide alone or in admixture with one another, if necessary in diluted form. The molecular weight or the viscosity of copolymers having the same composition may not only be influenced by the reaction temperature, amounting to about 80° to 200° C., and the catalyst quantity but also by means of regulators, such as SH-groups-containing organic compounds which are capable of performing the function of a redox component in the catalyst system at the same time. Examples of regulators include: 2-mercaptoethanol, thioglycollic acid and dodecyl-mercaptan.

carried out within two hours feeding the components listed in Table 1.

1 g DTBP is added for secondary reaction and stirring is effected for one hour at about 135° C. After cooling to 80° C., the formulation is stirred up with a mixture of water and 45% sodium hydroxide solution at 50° C., resulting in a pH-value of the emulsion of 7 to 7.5 (measured in a dilution of 1:4) and a content of partially neutralized polymer of 35%-wt.

TABLE 1

| | Example | | | | | |
|---|---|---|---|---|---|---|
| | 3 | 4 | 5 | 6 | 7 | 8 |
| Monomer A (g) | 130 | 130 | 130 | 130 | — | — |
| Monomer B (g) | — | — | — | — | 130 | 130 |
| Acrylic acid (g) feed 1 | 70 | 70 | 70 | 53 | — | 7 |
| Methacrylic acid (g) feed 1 | — | — | — | — | 84 | — |
| DTBP (g) feed 2 | 8.4 | 16.8 | 8.4 | 8.4 | 16.8 | 16.8 |
| Mercaptoethanol (g) feed 3 | 3.0 | 3.0 | 6.1 | 3.0 | 1.0 | 3.0 |
| Butyl glycol (g) feed 3 | 13.4 | 13.4 | 8.4 | 3.4 | 13.4 | 13.4 |
| Viscosity prior to neutralization at 40° C. (mPa.s) | 7000 | 900 | 1800 | 500 | $256 \times 10^3$ | 1800 |

After the polymerization and separation of solvents/diluents, if necessary, the acid copolymers are brought into a water-dispersible form, optionally by neutralizing at least 20% of the carboxyl groups with a dilute base.

The present invention will be illustrated by the following examples.

EXAMPLE 1

Production of Monomer A 559 g Alfol 161 8 (Messrs. Condea) are placed into an agitated flask and 10 g of a 25% solution of potassium methylate in methanol are added. During heating to 140° C., methanol is distilled off, assisted by a slight nitrogen stream. After adding 228 g allyl glycidic ether, the reaction is allowed to continue for 4 hours at about 140° C.

EXAMPLE 2

Production of Monomer B 632 g stearic acid are reacted with 229 g allyl glycidic ether as in Example 1.
A.V.: 15

EXAMPLES 3 TO 8

Production of the Copolymers 67 g butyl glycol, 0.6 g ditertiary butyl peroxide (DTBP) and 130 g monomer A or B are placed in an agitated flask equipped with distillation head and heated to 135° to 140° C. Within said temperature limits, the polymerization is

EXAMPLE 9

72 g butyl glycol, 0.6 g DTBP are heated to 140° C. in the agitated flask. Three separate substance streams are fed into the flask within 2 hours at 135° to 140° C. by means of dosing pumps. Feed 1:70.2 g acrylic acid mixed with 130 g monomer B; Feed 2:6.1 g mercaptoethanol; Feed 3:8.4 g DTBP dissolved in 8.4 g butyl glycol. 30 minutes after termination of the feeding, 1 g DTBP is added and stirring is effected for one hour at 135° C. Product viscosity at 40° C.: 1200 mPa.s. The formulation is cooled to about 50° C., and 277 g water containing 57 g 45% sodium hydroxide solution are admixed for neutralization purposes.

EXAMPLE 10 (COMPARATIVE POLYMER)

140 g butyl glycol are placed into the agitated flask and heated to 135° C. Within two hours the following is metered thereto in parallel: a mixture of 247.5 g methacrylic acid-C16/18-ester, 106 g acrylic acid and 17.7 g dodecylmercaptan; 14.8 g DTBP. During feeding the polymerization temperature rises to 145 ° C. 30 minutes after termination of the monomer feed, 1.7 g DTBP is added and stirring effected for one hour at 135° C. The batch is cooled to 80° C. and the oil phase is added quickly under stirring into a mixture of 85.2 g 45% sodium hydroxide solution and 458 g water. The pH amounts to 7.3, measured at a dilution of 1:4.

Application

Retanned cattle hides (wet-blue) of a shaved substance of 1.0 to 1.1 mm are treated. The %-indications relate to the shaved weight.

A) Neutralization

| A) Neutralization 200% water 35° C. | | |
|---|---|---|
| 2% sodium formate | | 30 minutes |
| 2% Tanigan PC[1] | | |
| 1% sodium hydrogencarbonate | | 45 minutes |
| 2% Tanigan BN[1] | | 30 minutes |
| Drain off bath A | | |
| Rinsing 60° C. | | 5 minutes |
| B) Fat-liquoring 100% water 60° C. | | |
| Example 11 | 12% product of Example 4 | 45 minutes |
| Example 12 | 12% product of Example 5 | 45 minutes |
| Example 13 | 12% product of Example 8 | 45 minutes |
| Example 14 | 12% product of Example 9 | 45 minutes |
| Example 15 (comparison) | 12% product of comparison 10 | 45 minutes |
| | 1% formic acid | 30 minutes |
| | Drain off bath B | |

[1]Bayer AG

The residual baths B from the leather fat-liquoring of Examples 11 to 14 and Comparative Example 15 are compared visually and their content of organic substance indicated as TOC-value (Total Organic Carbon) (cf. Table 2)

TABLE 2

| | residual bath B from Example | | | | 15 |
|---|---|---|---|---|---|
| | 11 | 12 | 13 | 14 | (comparison) |
| appearance | clear | clear | clear | clear | white-cloudy |
| TOC (g/l) | 3.2 | 3.7 | 3.0 | 3.4 | 6.1 |

The resistance of leather to water, e.g., rain drops or spilled liquid, is determined by a simple drop penetration test. A water drop is placed on the grain side of the leather and the time during which the moisture penetrates into the leather is determined in minutes.

The softness or "feel" of the leather cannot be measured objectively. No one but an expert can judge the leather by giving grades of 1=very good and 5=bad.

The light fastness of the leathers is determined according to DIN 75202.

TABLE 3

| | Fat-liquor of Example | | | | | | |
|---|---|---|---|---|---|---|---|
| | 3 | 4 | 5 | 6 | 7 | 8 | 9 |
| Drop test (min) (min) | 35 | 50 | 65 | 70 | 70 | 15 | 17 |
| Softness | 2-3 | 2 | 3-4 | 3 | 3 | 2-3 | 2 |
| Light fastness | 3-4 | 3-4 | 3 | 4 | 3-4 | 3-4 | 4 |

We claim:

1. A copolymer, comprising:
   a) 20–60% by weight of ethylenically unsaturated monomers having acid groups,
   b) 40–80% by weight of ethylenically unsaturated glycerol derivatives in which one hydroxyl group of the glycerol is unsubstituted, a second hydroxyl group is etherified with (meth) allyl alcohol, and a third hydroxyl group is etherified with a $C_{12-24}$ alcohol, a $C_{12-24}$ alkylphenol or said third hydroxyl group is esterified with a $C_{12-40}$ monocarboxylic acid, and
   c) 0–30% by weight of other ethylenically unsaturated copolymerizable monomers, wherein the sum of said monomers a) +b)+c)=100 wt. %.

2. The copolymer of claim 1, wherein at least 20% of said acid groups are neutralized with aqueous ammonia solution or aqueous alkali hydroxide solution.

3. A method of treating tanned leather, comprising contacting tanned leather with the copolymer of claim 1.

4. The method of claim 3, wherein said tanned leather is contacted with an aqueous dispersion of said copolymer, wherein said aqueous dispersion comprises at least 1 wt. % of said copolymer relative to the weight of said tanned leather.

5. The method of claim 3, further comprising:
   washing tanned leather,
   neutralizing said washed tanned leather,
   further washing said neutralized tanned leather with a dispersion comprising 1–10 wt. % of said copolymer, relative to the weight of the tanned leather, to form a treated tanned leather.

6. The method of claim 5, further comprising milling said tanned treated leather in a drum containing said dispersion for 0.5–2 hours at a weight ratio of said dispersion to the shaved weight of said tanned leather of 1:1.

7. The method of claim 6, further comprising adding aqueous formic acid to said milled leather, thereby fixing said copolymer to said milled leather.

8. The copolymer of claim 1, wherein said ethylenically unsaturated monomers having acid groups are selected from the group consisting of acrylic acid, methacrylic acid, dimethylacrylic acid, maleic acid, fumaric acid, monoalkylmaleinate, monoalkylglycol maleinate, (meth-)allyl sulfonic acid, acrylamidomethylpropane sulfonic acid, allylphosphonic acid and mixtures thereof.

9. The copolymer of claim 1, wherein said ethylenically unsaturated glycerol derivatives have the formula shown below:

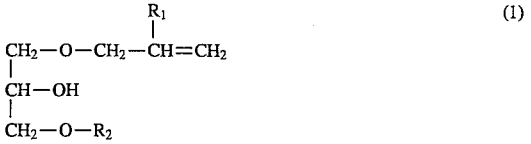

wherein $R_1$ is hydrogen or methyl and $R_2$ is $C_{12}$–$C_{24}$-alkyl, $C_{12}$–$C_{24}$-alkylaryl or $C_{12}$–$C_{40}$-acyl.

10. The copolymer of claim 1, wherein said third hydroxyl group is etherified with a $C_{12\geq}$ alcohol.

11. The copolymer of claim 1, wherein said third hydroxyl group is etherified with a $C_{12-24}$ alkyl phenol.

12. The copolymer of claim 1, wherein said third hydroxyl group is esterified with a $C_{12-40}$ monocarboxylic acid.

13. The copolymer of claim 1, wherein said other ethylenically unsaturated copolymerizable monomers are selected from the group consisting of $C_8$–$C_{24}$-esters of (methyl)acrylic acid, $C_8$–$C_{26}$-amides of (meth)acrylic acid, vinyl esters of $C_8$–$C_{24}$-carboxylic acids and $C_{10}$–$C_{18}$-alpha-olefins.

14. The copolymer of claim 1, wherein said other ethylenically unsaturated copolymerizable monomers are selected from the groups consisting of $C_1$–$C_8$-esters of (meth)acrylic acid, $C_1$–$C_8$-amides of (meth)acrylic acid, hydroxy-$C_2$–$C_4$-esters of (meth) acrylic acid, di-$C_1$–$C_6$-alkyl esters of maleic acid, styrene, alkylstyrene and vinyl esters of $C_1$–$C_8$-carboxylic acids.

* * * * *